United States Patent
Ogata et al.

(10) Patent No.: US 11,774,893 B2
(45) Date of Patent: Oct. 3, 2023

(54) MEASUREMENT DEVICE AND IMAGE FORMING APPARATUS

(71) Applicant: FUJIFILM Business Innovation Corp., Tokyo (JP)

(72) Inventors: Kenta Ogata, Kanagawa (JP); Kouhei Yukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 92 days.

(21) Appl. No.: 17/458,565

(22) Filed: Aug. 27, 2021

(65) Prior Publication Data

US 2022/0373951 A1 Nov. 24, 2022

(30) Foreign Application Priority Data

May 20, 2021 (JP) ................................. 2021-085626

(51) Int. Cl.
*G03G 15/00* (2006.01)
*G01N 27/04* (2006.01)

(52) U.S. Cl.
CPC ....... *G03G 15/5029* (2013.01); *G01N 27/045* (2013.01); *G03G 2215/00616* (2013.01);
(Continued)

(58) Field of Classification Search
CPC ..... G03G 15/5029; G03G 2215/00616; G03G 2215/00637; G03G 2215/00717;
(Continued)

(56) References Cited

U.S. PATENT DOCUMENTS

| 8,875,581 B2 * | 11/2014 | Nakamura | G03G 15/5029 |
| | | | 73/632 |
| 2017/0123359 A1 | 5/2017 | Monde et al. | |
| 2018/0314199 A1 * | 11/2018 | Matsuda | G03G 15/5029 |
| 2019/0265607 A1 | 8/2019 | Ishimoto et al. | |

(Continued)

FOREIGN PATENT DOCUMENTS

| JP | H0619341 | 1/1994 |
| JP | 2002108068 A * | 4/2002 |

(Continued)

OTHER PUBLICATIONS

"Search Report of Europe Counterpart Application", dated Mar. 15, 2022, p. 1-p. 8.

*Primary Examiner* — Ryan D Walsh
(74) *Attorney, Agent, or Firm* — JCIPRNET

(57) ABSTRACT

A measurement device includes: a resistance measurement unit that measures an electrical resistance of a measurement target; a first measurement unit, including a detector that detects information indicating a first physical property other than the electrical resistance of the measurement target, that measures the first physical property from a detection result from the detector; a second measurement unit, including a detector that detects information indicating a second physical property other than the electrical resistance and the first physical property of the measurement target, that measures the second physical property from a detection result from the detector, in which a length of time from a start of driving the detector until a start of actual measurement is longer in the second measurement unit than in the first measurement unit; and a control unit that performs first control causing the first measurement unit to execute a measurement operation of measuring the first physical property in parallel with a measurement operation by the resistance measurement unit, and performs second control causing the second measure- (Continued)

ment unit to execute a measurement operation of measuring the second physical property in parallel with the measurement operation by the resistance measurement unit and also causing the second measurement unit to start the driving of the detector in the second measurement unit before the start of the driving of the detector in the first measurement unit.

20 Claims, 9 Drawing Sheets

(52) U.S. Cl.
CPC ............ *G03G 2215/00637* (2013.01); *G03G 2215/00717* (2013.01); *G03G 2215/00742* (2013.01); *G03G 2215/00763* (2013.01)

(58) Field of Classification Search
CPC .......... G03G 2215/00742; G03G 2215/00763; G01N 27/045; B41J 11/0095
See application file for complete search history.

(56) References Cited

U.S. PATENT DOCUMENTS

| | | | | |
|---|---|---|---|---|
| 2020/0122942 A1* | 4/2020 | Izumiya | ................... | B65H 7/02 |
| 2020/0192261 A1 | 6/2020 | Ogata et al. | | |
| 2020/0240843 A1* | 7/2020 | Kanai | ........................ | G01J 3/50 |
| 2022/0179347 A1* | 6/2022 | Maruyama | ......... | G03G 15/5029 |
| 2022/0371349 A1* | 11/2022 | Ogata | .................... | G01B 17/02 |
| 2022/0373326 A1* | 11/2022 | Ogata | .................... | G01B 17/02 |
| 2022/0373954 A1* | 11/2022 | Ogata | ................ | G03G 15/5054 |

FOREIGN PATENT DOCUMENTS

| | | | | | |
|---|---|---|---|---|---|
| JP | 2010049285 A | * | 3/2010 | ............ | G06F 11/008 |
| JP | 2011137774 | | 7/2011 | | |
| JP | 2012145819 A | * | 8/2012 | | |
| JP | 2018135201 A | * | 8/2018 | | |
| JP | 2019119578 A | * | 7/2019 | | |
| JP | 2019124793 A | * | 7/2019 | | |

* cited by examiner

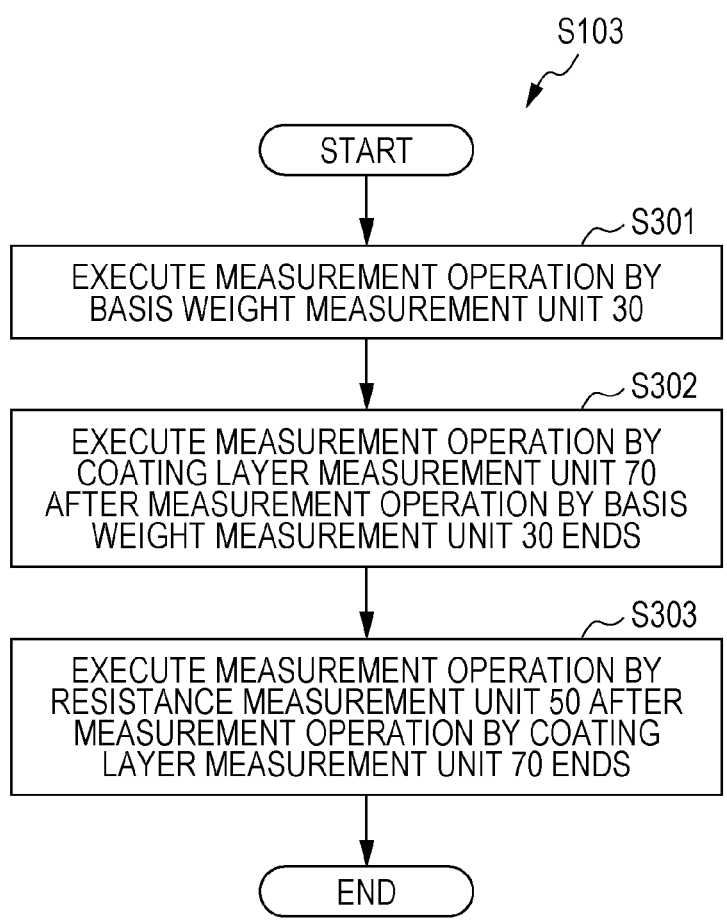

MEASUREMENT DEVICE AND IMAGE FORMING APPARATUS

CROSS-REFERENCE TO RELATED APPLICATIONS

This application is based on and claims priority under 35 USC 119 from Japanese Patent Application No. 2021-085626 filed May 20, 2021.

BACKGROUND

(i) Technical Field

The present disclosure relates to a measurement device and an image forming apparatus.

(ii) Related Art

Japanese Unexamined Patent Application Publication No. 2011-137774 discloses a measurement terminal used to measure the resistance of a thin film using four-terminal sensing, in which the positions of the four measurement terminals are fixed such that the value obtained by dividing a measured voltage value by a current value is equal to the sheet resistance value of a thin film.

SUMMARY

A conceivable measurement device may be provided with a resistance measurement unit that measures the electrical resistance of a measurement target, a first measurement unit, and a second measurement unit. The first measurement unit includes a detector that detects information indicating a first physical property other than the electrical resistance of the measurement target, and measures the first physical property from a detection result from the detector. The second measurement unit includes a detector that detects information indicating a second physical property other than the electrical resistance and the first physical property of the measurement target, and measures the second physical property from a detection result from the detector. The length of time from the start of driving the detector until the start of actual measurement is longer in the second measurement unit than in the first measurement unit.

In the measurement device, if the operations for measuring the first physical property and the second physical property are executed in parallel with the measurement operation by the resistance measurement unit, and the driving of the detector in the second measurement unit is started after starting the driving of the detector in the first measurement unit, the measurement time until the measurements of the electrical resistance, the first physical property, and the second physical property are completed may increase in some cases.

Aspects of non-limiting embodiments of the present disclosure relate to a configuration in which the operations for measuring the first physical property and the second physical property are executed in parallel with the measurement operation by the resistance measurement unit, such that the measurement time until the measurements of the electrical resistance, the first physical property, and the second physical property are completed is shortened compared to a configuration in which the driving of the detector in the second measurement unit is started after starting the driving of the detector in the first measurement unit.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a measurement device including: a resistance measurement unit that measures an electrical resistance of a measurement target; a first measurement unit, including a detector that detects information indicating a first physical property other than the electrical resistance of the measurement target, that measures the first physical property from a detection result from the detector; a second measurement unit, including a detector that detects information indicating a second physical property other than the electrical resistance and the first physical property of the measurement target, that measures the second physical property from a detection result from the detector, in which a length of time from a start of driving the detector until a start of actual measurement is longer in the second measurement unit than in the first measurement unit; and a control unit that performs first control causing the first measurement unit to execute a measurement operation of measuring the first physical property in parallel with a measurement operation by the resistance measurement unit, and performs second control causing the second measurement unit to execute a measurement operation of measuring the second physical property in parallel with the measurement operation by the resistance measurement unit and also causing the second measurement unit to start the driving of the detector in the second measurement unit before the start of the driving of the detector in the first measurement unit.

BRIEF DESCRIPTION OF THE DRAWINGS

Exemplary embodiments of the present disclosure will be described in detail based on the following figures, wherein:

FIG. 9 is a flowchart illustrating a flow of the serial operation mode according to the exemplary embodiment.

DETAILED DESCRIPTION

Hereinafter, an exemplary embodiment of the present disclosure will be described in detail on the basis of the drawings.

(Image Forming Apparatus 10)

Figure 1:
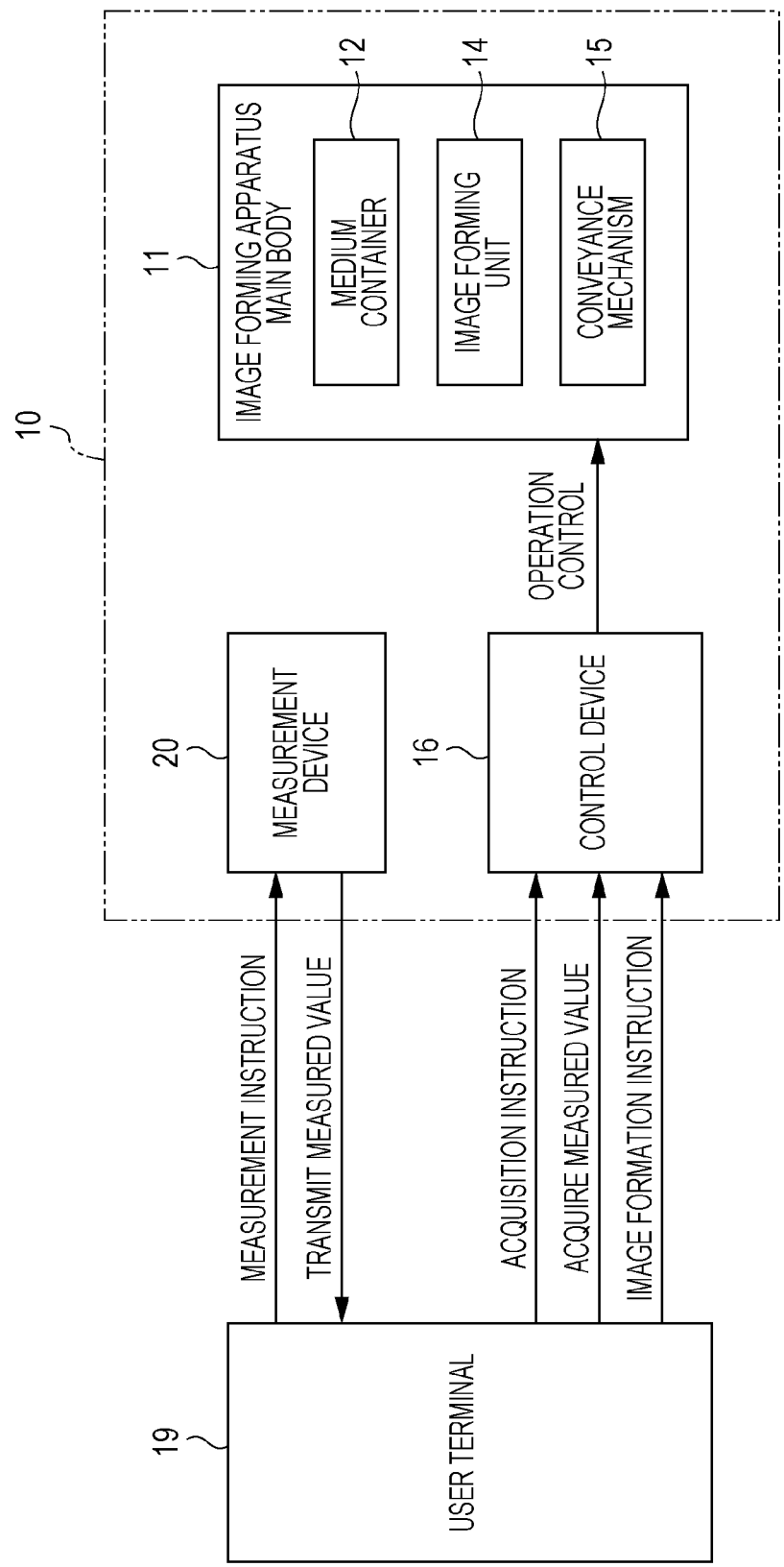
FIG. 1 is a block diagram illustrating a configuration of an image forming apparatus according to an exemplary embodiment.

A configuration of an image forming apparatus 10 according to the exemplary embodiment will be described. FIG. 1 is a block diagram illustrating a configuration of the image forming apparatus 10 according to the exemplary embodiment.

The image forming apparatus 10 illustrated in FIG. 1 is an apparatus that forms images. Specifically, as illustrated in FIG. 1, the image forming apparatus 10 is provided with an image forming apparatus main body 11, a medium container 12, an image forming unit 14, a conveyance mechanism 15, a control device 16, and a measurement device 20. The image forming apparatus 10 is capable of transmitting and receiving information with a user terminal 19. Hereinafter, each component of the image forming apparatus 10 will be described.

(Image Forming Apparatus Main Body 11)

The image forming apparatus main body 11 illustrated in FIG. 1 is a portion in which the components of the image forming apparatus 10 are provided. Specifically, the image forming apparatus main body 11 is a box-shaped housing, for example. In the exemplary embodiment, the medium container 12, the image forming unit 14, and the conveyance mechanism 15 are provided inside the image forming apparatus main body 11.

(Medium Container 12)

The medium container 12 illustrated in FIG. 1 is a portion that contains paper P in the image forming apparatus 10. The paper P contained in the medium container 12 is supplied to the image forming unit 14. Note that the paper P is one example of a "recording medium".

(Image Forming Unit 14)

The image forming unit 14 illustrated in FIG. 1 includes a function of forming an image on the paper P supplied from the medium container 12. Examples of the image forming unit 14 include an inkjet image forming unit that forms an image on the paper P using ink, and an electrophotographic image forming unit that forms an image on the paper P using toner.

In an inkjet image forming unit, an image is formed on the paper P by ejecting ink droplets from nozzles onto the paper P. In an inkjet image forming unit, an image may also be formed on the paper P by ejecting ink droplets from nozzles onto a transfer medium, and then transferring the ink droplets from the transfer medium to the paper P.

In an electrophotographic image forming unit, an image is formed on the paper P by performing the steps of charging, exposing, developing, transferring, and fusing, for example. In an electrophotographic image forming unit, an image may also be formed on the paper P by performing the charging, exposing, developing, and transferring steps to form an image on a transfer medium, transferring the image from the transfer medium to the paper P, and then fusing the image to the paper P.

Note that examples of the image forming unit are not limited to the inkjet image forming unit and the electrophotographic image forming unit described above, and any of various types of image forming units may be used.

(Conveyance Mechanism 15)

The conveyance mechanism 15 illustrated in FIG. 1 is a mechanism that conveys the paper P. As an example, the conveyance mechanism 15 conveys the paper P with conveyor members (not illustrated) such as conveyor rollers and conveyor belts. The conveyance mechanism 15 conveys the paper P from the medium container 12 to the image forming unit 14 along a predetermined conveyance path.

(Overview of User Terminal 19, Control Device 16, and Measurement Device 20)

The user terminal 19 illustrated in FIG. 1 is a terminal such as a smartphone, a tablet, or a personal computer, for example. The user terminal 19 is capable of communicating with the measurement device 20 and the control device 16 in a wired or wireless manner. As illustrated in FIG. 1, the measurement device 20 and the control device 16 are provided outside the image forming apparatus main body 11, for example. Note that each of the user terminal 19 and the control device 16 includes a control unit (control board) including a recording unit such as storage storing a program and a processor that operates according to the program.

In the exemplary embodiment, an operator (that is, a user) of the image forming apparatus 10 places desired paper P on which to form an image in the measurement device 20, and issues a measurement instruction from the user terminal 19, for example. The measurement device 20 acquires the measurement instruction from the user terminal 19, measures physical properties of the paper P, and transmits measured value information indicating measured values of the physical properties to the user terminal 19.

The operator (that is, the user) of the image forming apparatus 10 puts the paper P measured by the measurement device 20 into the medium container 12, and issues an acquisition instruction and an image formation instruction from the user terminal 19, for example. Note that the image formation instruction may also double as the acquisition instruction.

The control device 16 acquires the acquisition instruction from the user terminal 19 and acquires the measured value information from the user terminal 19. The control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information. Specifically, the control device 16 controls settings such as the conveyance speed of the paper P in the conveyance mechanism 15 and also the transfer voltage and fusing temperature in the image forming unit 14 on the basis of the measured value information.

Note that in the example described above, the control device 16 is provided outside the image forming apparatus main body 11, but the control device 16 may also be provided inside the image forming apparatus main body 11. Additionally, the control device 16 acquires the measured value information from the measurement device 20 through the user terminal 19, but the control device 16 may also be configured to acquire the measured value information directly from the measurement device 20.

Furthermore, the measurement device 20 is provided outside the image forming apparatus main body 11, but the measurement device 20 may also be provided inside the image forming apparatus main body 11. Specifically, the measurement device 20 may also be configured as a device that measures physical properties in the medium container 12 or on the conveyance path of the paper P.

(Specific Configuration of Measurement Device 20)

Figure 2:
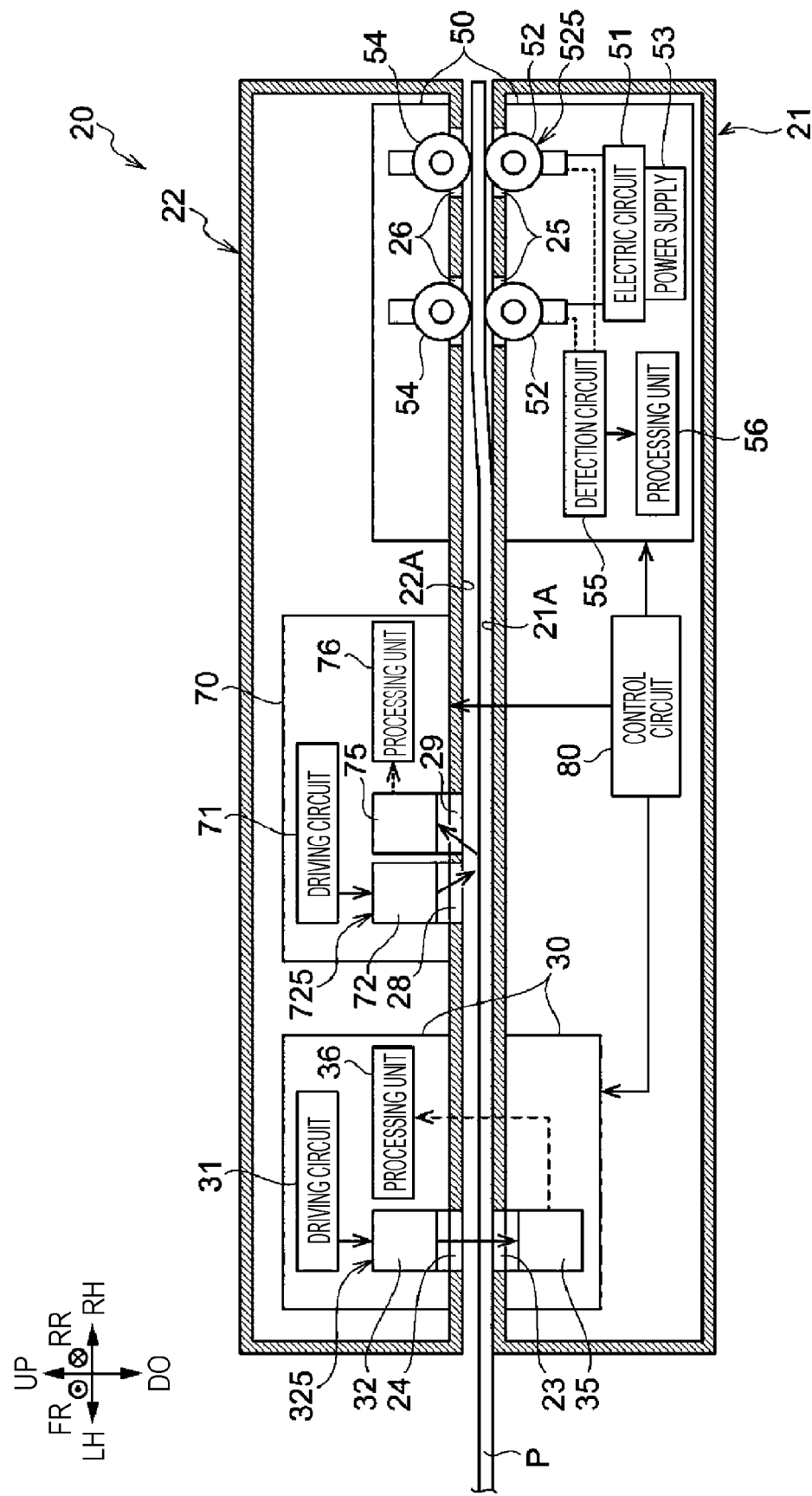
FIG. 2 is a schematic diagram illustrating a configuration of a measurement device according to the exemplary embodiment.

FIG. 2 is a schematic block diagram illustrating a configuration of the measurement device 20 according to the exemplary embodiment. Note that the arrow UP illustrated in the drawing indicates the upward (vertically upward) direction of the device, and the arrow DO indicates the downward (vertically downward) direction of the device. Also, the arrow LH illustrated in the drawing indicates the left-hand direction of the device, and the arrow RH indicates the right-hand direction of the device. Also, the arrow FR illustrated in the drawing indicates the forward direction of the direction, and the arrow RR indicates the rearward direction of the device. These directions have been defined for convenience in the following description, and the device configuration is not limited to these directions. Note that each direction of the device may be indicated while omitting the word "device" in some cases. In other words, for example, the "upward direction of the device" may simply be referred to as the "upward direction" in some cases.

Also, in the following description, the "vertical direction" is used to mean "both the upward direction and the downward direction" or "either the upward direction or the downward direction" in some cases. The "transverse direction" is used to mean "both the left-hand direction and the right-hand direction" or "either the left-hand direction or the right-hand direction" in some cases. The "transverse direction" may also be referred to as the horizontal or lateral direction. The "longitudinal direction" is used to mean "both the forward direction and the rearward direction" or "either the forward direction or the rearward direction" in some cases. The "longitudinal direction" may also be referred to as the horizontal or lateral direction. Also, the vertical direction, the transverse direction, and the longitudinal direction are mutually intersecting directions (specifically, orthogonal directions).

Also, the symbol of an "x" inside a circle "○" denotes an arrow going into the page. Also, the symbol of a dot "•" inside a circle "○" denotes an arrow coming out of the page.

The measurement device 20 is a device that measures physical properties of the paper P used in the image forming apparatus 10. Specifically, the measurement device 20 measures the basis weight, the electrical resistance, and the presence or absence of a coating layer of the paper P. Note that "measurement" means measuring a value (that is, the degree) of a physical property, and the value of a physical property is a concept that includes 0 (zero). In other words, "measurement" includes measuring whether or not the value of a physical property is 0 (zero), that is, measuring whether or not a physical property is present.

Specifically, as illustrated in FIG. 2, the measurement device 20 is provided with a first housing 21, a second housing 22, a basis weight measurement unit 30, a resistance measurement unit 50, and a coating layer measurement unit 70. Hereinafter, each unit of the measurement device 20 will be described.

(First Housing 21)

The first housing 21 is a portion in which some of the components of the measurement device 20 are provided. The first housing 21 forms the portion on the downward side of the measurement device 20. The first housing 21 has an opposing surface 21A that faces the bottom surface of the paper P. The opposing surface 21A is also a support surface that supports the paper P from underneath. Inside the first housing 21, a portion of the basis weight measurement unit 30 and a portion of the resistance measurement unit 50 are disposed.

(Second Housing 22)

The second housing 22 is a portion in which some other components of the measurement device 20 are provided. The second housing 22 forms the portion on the upward side of the measurement device 20. The second housing 22 has an opposing surface 22A that faces the top surface of the paper P. Inside the second housing 22, another portion of the basis weight measurement unit 30, the coating layer measurement unit 70, and another portion of the resistance measurement unit 50 are disposed. In the measurement device 20, the paper P given as one example of a measurement target is disposed between the first housing 21 and the second housing 22.

(Basis Weight Measurement Unit 30)

The basis weight measurement unit 30 illustrated in FIG. 2 includes a function of measuring the basis weight [$g/m^2$] of the paper P by causing the paper P to vibrate using an ultrasonic wave. The basis weight measurement unit 30 is an example of a "first measurement unit". The paper P is an example of a "measurement target". The basis weight is an example of a "first physical property other than electrical resistance". Specifically, as illustrated in FIG. 2, the basis weight measurement unit 30 includes a driving circuit 31, an emission unit 32, a reception unit 35, and a processing unit 36.

The emission unit 32 includes a function of emitting an ultrasonic wave at the paper P. The emission unit 32 is disposed in the second housing 22. Namely, the emission unit 32 is disposed at a position facing one surface (specifically, the top surface) of the paper P. Note that an opening 24 allowing the ultrasonic wave from the emission unit 32 to pass through to the paper P is formed underneath the emission unit 32 in the second housing 22.

The driving circuit 31 is a circuit that drives the emission unit 32. By causing the driving circuit 31 to drive the emission unit 32, the emission unit 32 imparts an ultrasonic wave to the top surface of the paper P, causing the paper P to vibrate. The vibrating paper P causes air underneath the paper P to vibrate. In other words, the ultrasonic wave from the emission unit 32 is transmitted through the paper P.

The reception unit 35 includes a function of receiving the ultrasonic wave transmitted through the paper P. The reception unit 35 is disposed in the first housing 21. Namely, the reception unit 35 is disposed at a position facing the other surface (specifically, the bottom surface) of the paper P. The reception unit 35 generates a reception signal by receiving the ultrasonic wave transmitted through the paper P. Note that an opening 23 allowing the ultrasonic wave from the paper P to pass through to the reception unit 35 is formed above the reception unit 35 in the first housing 21.

In this way, in the basis weight measurement unit 30, the emission unit 32 and the reception unit 35 form a detector 32S (specifically, a detection sensor) that detects information (specifically, the ultrasonic wave transmitted through the paper P) indicating the basis weight of the paper P. The driving circuit 31 forms a circuit that drives the detector 32S.

The processing unit 36 obtains a measured value by performing a process such as amplification on the reception signal (that is, the detection result) acquired from the reception unit 35. Furthermore, the processing unit 36 outputs measured value information indicating the obtained measured value to the user terminal 19. The processing unit 36 is configured by an electric circuit including an amplification circuit or the like, for example.

The measured value obtained by the processing unit 36 is a value correlated with the basis weight of the paper P. Consequently, measurement in the basis weight measurement unit 30 includes not only the case of measuring the basis weight itself of the paper P, but also the case of measuring a measurement value correlated with the basis weight of the paper P.

Note that in the basis weight measurement unit 30, the basis weight of the paper P may also be calculated on the basis of the measured value obtained by the processing unit 36. Specifically, the basis weight measurement unit 30 calculates the basis weight from correlation data indicating the correlation between the measured value and the basis weight, for example. As above, in the basis weight measurement unit 30, the basis weight of the paper P is measured from the detection result from the detector 325.

(Coating Layer Measurement Unit 70)

The coating layer measurement unit 70 illustrated in FIG. 2 includes a function of measuring the presence or absence of a coating layer of the paper P. A coating layer is a layer formed by applying a coating agent to the surface of paper. In other words, the coating layer measurement unit 70 measures whether or not the paper P is paper with a coating (that is, coated paper).

The coating layer measurement unit 70 is an example of a "second measurement unit". The presence or absence of a coating layer is an example of a "second physical property other than electrical resistance and the first physical property". Specifically, as illustrated in FIG. 2, the coating layer measurement unit 70 includes a driving circuit 71, a light irradiation unit 72, a light reception unit 75, and a processing unit 76.

The light irradiation unit 72 includes a function of irradiating the paper P with light. The light irradiation unit 72 is disposed in the second housing 22. Namely, the light irradiation unit 72 is disposed at a position facing one surface (specifically, the top surface) of the paper P with a gap in between. Note that an opening 28 allowing the light from the light irradiation unit 72 to pass through to the paper P is formed underneath the light irradiation unit 72 in the second housing 22.

The driving circuit 71 is a circuit that drives the light irradiation unit 72. By causing the driving circuit 71 to drive the light irradiation unit 72, the light irradiation unit 72 irradiates the paper P with light, and the light reflects off the paper P.

The light reception unit 75 includes a function of receiving reflected light that has reflected off the paper P. The light reception unit 75 is disposed in the second housing 22. Namely, the light reception unit 75 is disposed at a position facing one surface (specifically, the top surface) of the paper P with a gap in between. The light reception unit 75 generates a light reception signal by receiving the reflected light that has reflected off the paper P. Note that an opening 29 allowing the light from the paper P to pass through to the light reception unit 75 is formed underneath the reception unit 75 in the second housing 22.

In this way, in the coating layer measurement unit 70, the light irradiation unit 72 and the light reception unit 75 form a detector 725 (specifically, a detection sensor) that detects information (specifically, the reflected light reflected off the paper P) indicating the presence or absence of a coating layer of the paper P. The driving circuit 71 forms a circuit that drives the detector 725.

The processing unit 76 obtains a measured value by performing a process such as amplification on the light reception signal (that is, the detection result) acquired from the light reception unit 75. Furthermore, the processing unit 76 outputs measured value information indicating the obtained measured value to the user terminal 19. The processing unit 76 is configured by an electric circuit including an amplification circuit or the like, for example.

The measured value obtained by the processing unit 76 is a value correlated with the presence or absence of a coating layer of the paper P. Consequently, measurement in the coating layer measurement unit 70 includes not only the case of measuring the presence or absence of a coating layer itself of the paper P, but also the case of measuring a measurement value correlated with the presence or absence of a coating layer of the paper P.

Note that in the coating layer measurement unit 70, the presence or absence of a coating layer of the paper P may also be measured on the basis of the measured value obtained by the processing unit 76. Specifically, the presence or absence of a coating layer is measured according to whether or not the measured value exceeds a predetermined threshold, for example. As above, in the coating layer measurement unit 70, the presence or absence of a coating layer of the paper P is measured from the detection result from the detector 725.

(Resistance Measurement Unit 50)

The resistance measurement unit 50 illustrated in FIG. 2 includes a function of measuring the sheet resistance value [Ω] of the paper P. The resistance measurement unit 50 is an example of a "resistance measurement unit". Sheet resistance is an example of "electrical resistance". Specifically, as illustrated in FIG. 2, the resistance measurement unit 50 includes an electric circuit 51, a pair of terminals 52, a power supply 53, a pair of opposing members 54, a detection circuit 55, and a processing unit 56.

The pair of terminals 52 are disposed in the first housing 21, for example. The pair of terminals 52 are spaced from each other by an interval in the transverse direction, and contact the bottom surface of the paper P through an opening 25 formed in the first housing 21. Each of the pair of terminals 52 is electrically connected to the power supply 53 through the electric circuit 51.

Each of the pair of opposing members 54 opposes a corresponding one of the pair of terminals 52, with the paper P disposed between the pair of opposing members 54 and the pair of terminals 52. Each of the pair of opposing members 54 contacts the top surface of the paper P through an opening 26 formed in the second housing 22. In other words, the paper P is pinched between each of the pair of opposing members 54 and each of the pair of terminals 52. As an example, each of the pair of opposing members 54 and each of the pair of terminals 52 are configured as rollers.

The power supply 53 applies a predetermined voltage ([V]) to the pair of terminals 52 through the electric circuit 51. With this arrangement, a current corresponding to the sheet resistance of the paper P flows between the pair of terminals 52. The detection circuit 55 is electrically connected to the pair of terminals 52. The detection circuit 55 generates a detection signal by detecting the current flowing between the pair of terminals 52.

In this way, in the resistance measurement unit 50, the pair of terminals 52 and the detection circuit 55 form a detector 525 (specifically, a detection sensor) that detects information (specifically, the current flowing through the paper P) indicating the sheet resistance of the paper P. The electric circuit 51 forms a circuit that drives the detector 525.

The processing unit 56 obtains a measured value (specifically, a current value [A]) by performing a process such as amplification on the detection signal (that is, the detection result) acquired from the detection circuit 55. Furthermore, the processing unit 56 outputs measured value information indicating the obtained measured value to the user terminal 19. The processing unit 56 is configured by an electric circuit including an amplification circuit or the like, for example.

The measured value obtained by the processing unit 56 is a value correlated with the sheet resistance value of the paper P. Consequently, measurement in the resistance measurement unit 50 includes not only the case of measuring the sheet resistance value itself of the paper P, but also the case of measuring a measurement value correlated with the sheet resistance value of the paper P. Note that in the resistance measurement unit 50, the sheet resistance value of the paper P may also be calculated on the basis of the measured value obtained by the processing unit 56. As above, in the resistance measurement unit 50, the sheet resistance value of the paper P is measured from the detection result from the detector 525.

Note that the resistance measurement unit 50 is configured to obtain the sheet resistance value by applying a predetermined voltage to the pair of terminals 52 and detecting the current flowing between the pair of terminals 52, but is not limited thereto. For example, the resistance measurement unit 50 may also be configured to obtain the sheet resistance value by passing a current with a predetermined current value through the pair of terminals 52 and detecting the voltage across the pair of terminals 52.

(Arrangement of Basis Weight Measurement Unit 30, Resistance Measurement Unit 50, and Coating Layer Measurement Unit 70)

At this point, the arrangement of the basis weight measurement unit 30, the resistance measurement unit 50, and the coating layer measurement unit 70 will be described.

As illustrated in FIG. 2, the basis weight measurement unit 30 is disposed at one end (specifically, the left end) of the first housing 21 and the second housing 22. On the other hand, the resistance measurement unit 50 is disposed at the other end (specifically, the right end) of the first housing 21 and the second housing 22.

The coating layer measurement unit 70 is disposed between the basis weight measurement unit 30 and the resistance measurement unit 50 in the transverse direction. Consequently, the coating layer measurement unit 70 is disposed together with the resistance measurement unit 50 and the basis weight measurement unit 30 to fit within the sheet size of the paper P. In the exemplary embodiment, the coating layer measurement unit 70 is disposed between the basis weight measurement unit 30 and the resistance measurement unit 50 as viewed from each of the longitudinal direction and the vertical direction.

In this way, in the exemplary embodiment, the basis weight measurement unit 30, the coating layer measurement unit 70, and the resistance measurement unit 50 are disposed in the above order proceeding from the left side to the right side of the measurement device 20 (specifically, the first housing 21 and the second housing 22). Consequently, in the exemplary embodiment, of the basis weight measurement unit 30 and the coating layer measurement unit 70, the measurement unit disposed at a position near the resistance measurement unit 50 is the coating layer measurement unit 70.

Also, in the exemplary embodiment, the paper P given as an example of a measurement target is disposed between the first housing 21 and the second housing 22, and is moved from the left side to the right side of the measurement device 20 (specifically, the first housing 21 and the second housing 22). Consequently, the detector 325 of the basis weight measurement unit 30 (specifically, the emission unit 32 and the reception unit 35), the detector 725 of the coating layer measurement unit 70 (specifically, the light irradiation unit 72 and the light reception unit 75), and the detector 525 of the resistance measurement unit 50 (specifically, the pair of terminals 52) are disposed in the above order proceeding in the movement direction of the paper P.

Note that in the case where the measurement device 20 is configured as a device that measures physical properties in the conveyance path of the paper P in an image forming apparatus, the measurement device 20 is configured such that the paper P is conveyed from the left side to the right side of the measurement device 20 (specifically, the first housing 21 and the second housing 22), for example.

(Measurement Operations in Basis Weight Measurement Unit 30, Resistance Measurement Unit 50, and Coating Layer Measurement Unit 70)

Figure 3:
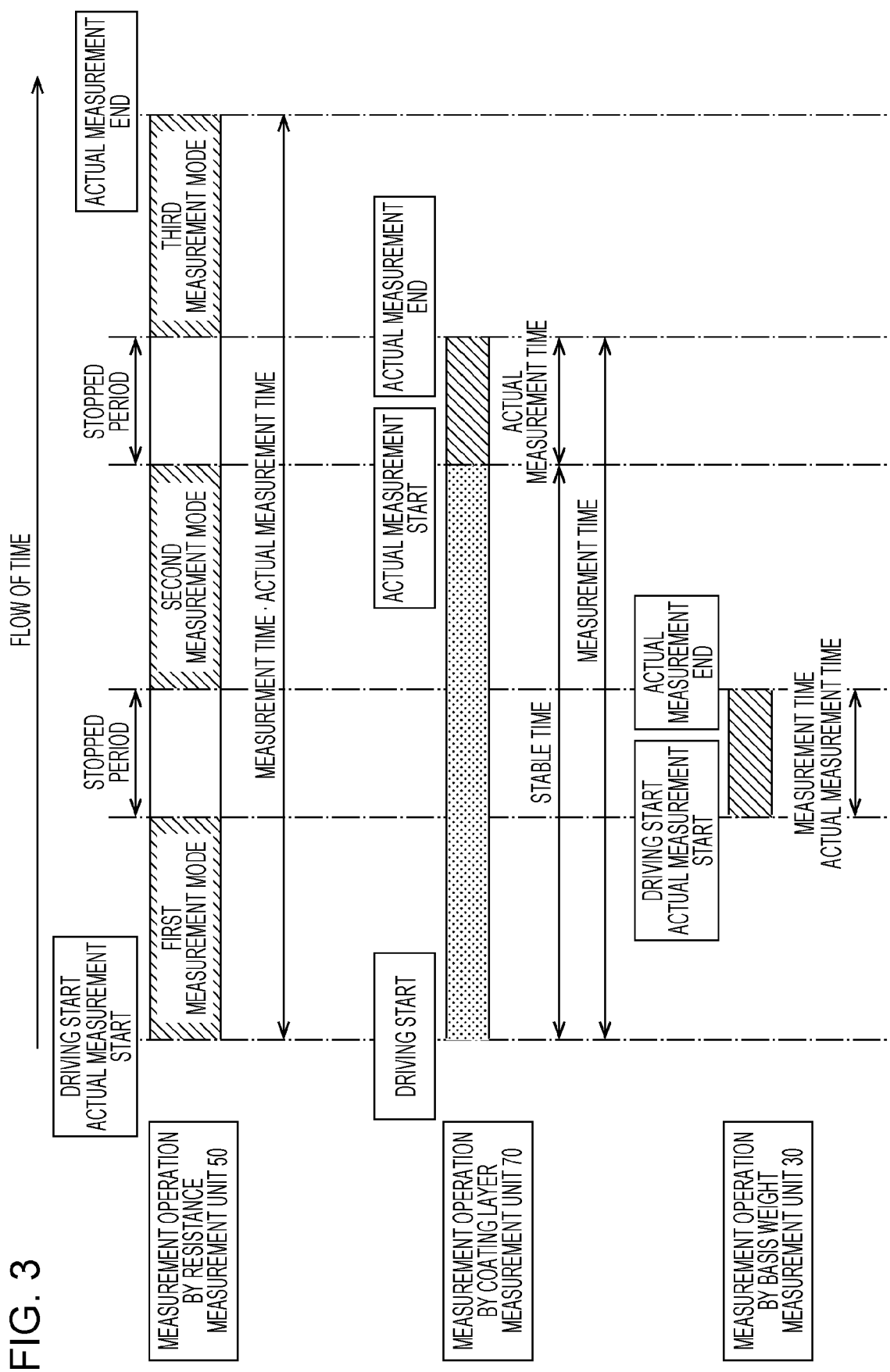
FIG. 3 is a diagram illustrating a measurement operation by each measurement unit in a parallel operation mode according to the exemplary embodiment.

In each of the basis weight measurement unit 30, the resistance measurement unit 50, and the coating layer measurement unit 70, the driving of each of the detectors 325, 525, and 725 is started to perform actual measurement of the physical properties (see FIG. 3). Namely, as illustrated in FIG. 3, the measurement operation in each of the basis weight measurement unit 30, the resistance measurement unit 50, and the coating layer measurement unit 70 are the operations from starting the driving of each of the detectors 325, 525, and 725 to start actual measurement of the physical properties until ending the actual measurement. Also, the measurement time is the time from starting the driving of each of the detectors 325, 525, and 725 to start actual measurement of the physical properties until ending the actual measurement. Note that actual measurement refers to actually measuring a physical property, that is, the state of obtaining a measured value from a detection result obtained from a detector that detects information indicating a physical property.

In the exemplary embodiment, as illustrated in FIG. 3, the resistance measurement unit 50 includes multiple measurement modes for measuring the sheet resistance value of the paper P. Specifically, the resistance measurement unit 50 includes first, second, and third measurement modes. Each of the first, second, and third measurement modes is a mode that measures a predetermined range of sheet resistance values.

Specifically, the first measurement mode is configured as a mode that measures sheet resistance values in a measurement range exceeding 11.5 [log Ω] and up to 14.5 [log Ω], for example. The second measurement mode is configured as a mode that measures sheet resistance values in a measurement range exceeding 9 [log Ω] and up to 11.5 [log Ω], for example. The third measurement mode is configured as a mode that measures sheet resistance values in a measurement range exceeding 4 [log Ω] and up to 9 [log Ω], for example. In each measurement mode, values such as the voltage to be applied to the paper P and the amplification in the amplification process are set in correspondence with each measurement range.

The resistance measurement unit 50 executes the first measurement mode, the second measurement mode, and the third measurement mode in the above order, for example. Note that the order in which the resistance measurement unit 50 executes the modes is not limited to the order described above.

Also, the resistance measurement unit 50 includes a stopped period during which actual measurement of the sheet resistance value is stopped, the stopped period occurring between the periods when the multiple measurement modes are executed.

In this way, because the resistance measurement unit 50 executes multiple measurement modes and also includes stopped periods between the measurement modes, the measurement time is longer than the measurement time for the basis weight measurement unit 30 and the measurement time for the coating layer measurement unit 70. Additionally, the measurement time for the coating layer measurement unit 70 is longer than the measurement time for the basis weight measurement unit 30.

Note that the measurement operation in the case of executing multiple measurement modes in the resistance measurement unit 50 is a concept that includes the stopped periods between the measurement modes. Consequently, the stopped periods between the measurement modes are included in the measurement time in the case of executing multiple measurement modes in the resistance measurement unit 50.

Also, in the exemplary embodiment, the coating layer measurement unit 70 starts driving the detector 725 (specifically, the light irradiation unit 72 and the light reception unit 75), and then starts the actual measurement of the presence or absence of a coating layer. In the coating layer measurement unit 70, it takes time until the output (namely, the intensity) of the light irradiation unit 72 stabilizes, and consequently actual measurement is performed after a predetermined amount of time has elapsed since starting the driving of the detector 725.

On the other hand, in the basis weight measurement unit 30 and the resistance measurement unit 50, actual measurement is performed at the same time or immediately after starting the driving of each of the detectors 325 and 525. Consequently, the time (hereinafter referred to as the stabilization time) from starting to drive the detector 725 until starting actual measurement in the coating layer measurement unit 70 is set longer than the stabilization time in the basis weight measurement unit 30 and the resistance measurement unit 50. Note that it is sufficient for the stabilization times in the basis weight measurement unit 30 and the resistance measurement unit 50 to be shorter than the stabilization time in the coating layer measurement unit 70, and the stabilization times may also be 0 (zero).

(Control Circuit 80)

Figure 5:
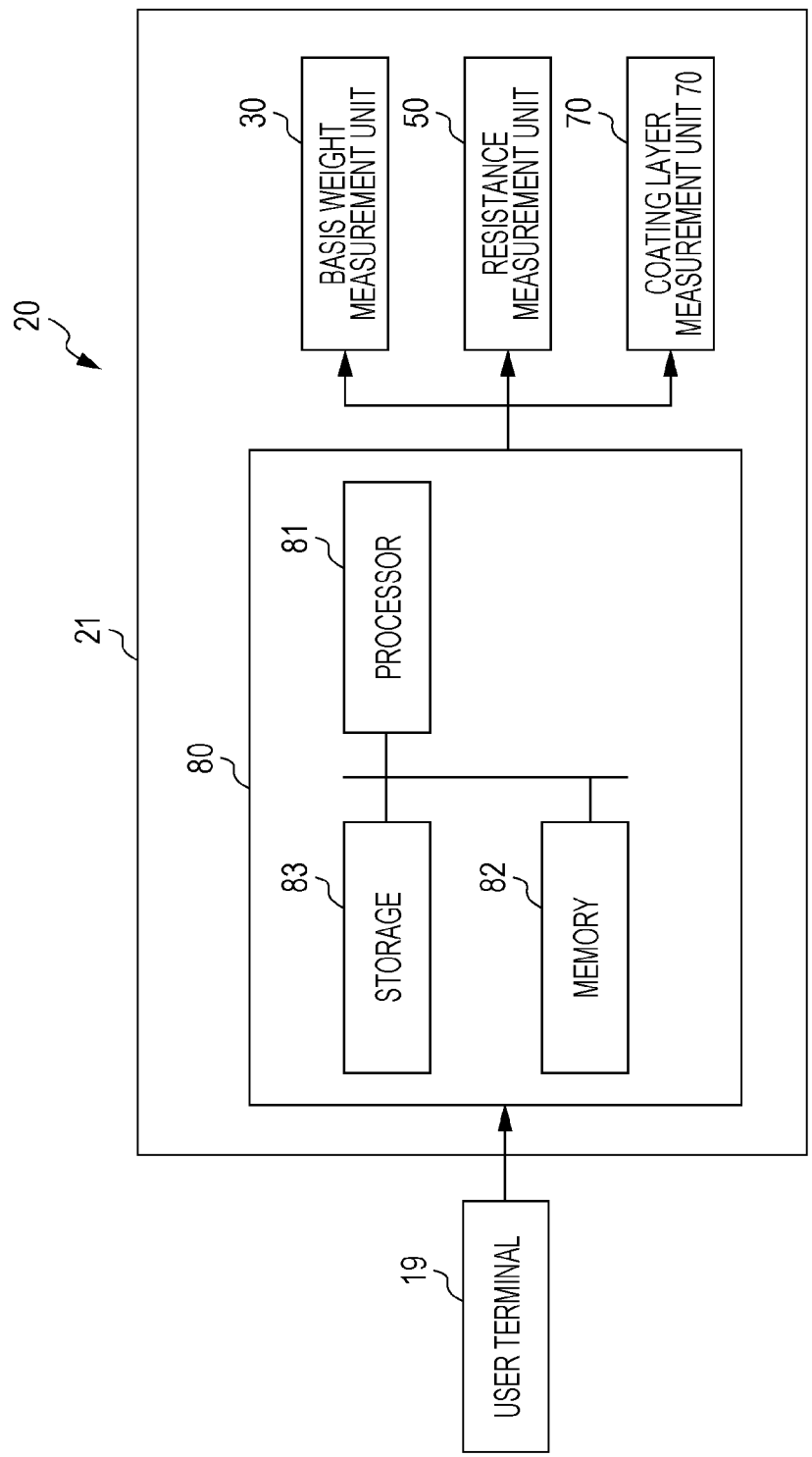
FIG. 5 is a block diagram illustrating an example of a hardware configuration of a control circuit according to the exemplary embodiment.

The control circuit 80 includes a control function that controls operations by the basis weight measurement unit 30, the resistance measurement unit 50, and the coating layer measurement unit 70. Specifically, as illustrated in FIG. 5, the control circuit 80 includes a processor 81, a memory 82, and storage 83.

The storage 83 stores various programs, including a control program 83A (see FIG. 6), and various data. The storage 83 is achieved specifically by a recording device such as a hard disk drive (HDD), a solid-state drive (SSD), or flash memory.

The memory 82 is a work area that the processor 81 uses to execute various programs, and temporarily records various programs or various data when the processor 81 executes a process. The processor 81 reads out various programs including the control program 83A from the storage 83 into the memory 82, and executes the programs using the memory 82 as a work area.

Figure 6:
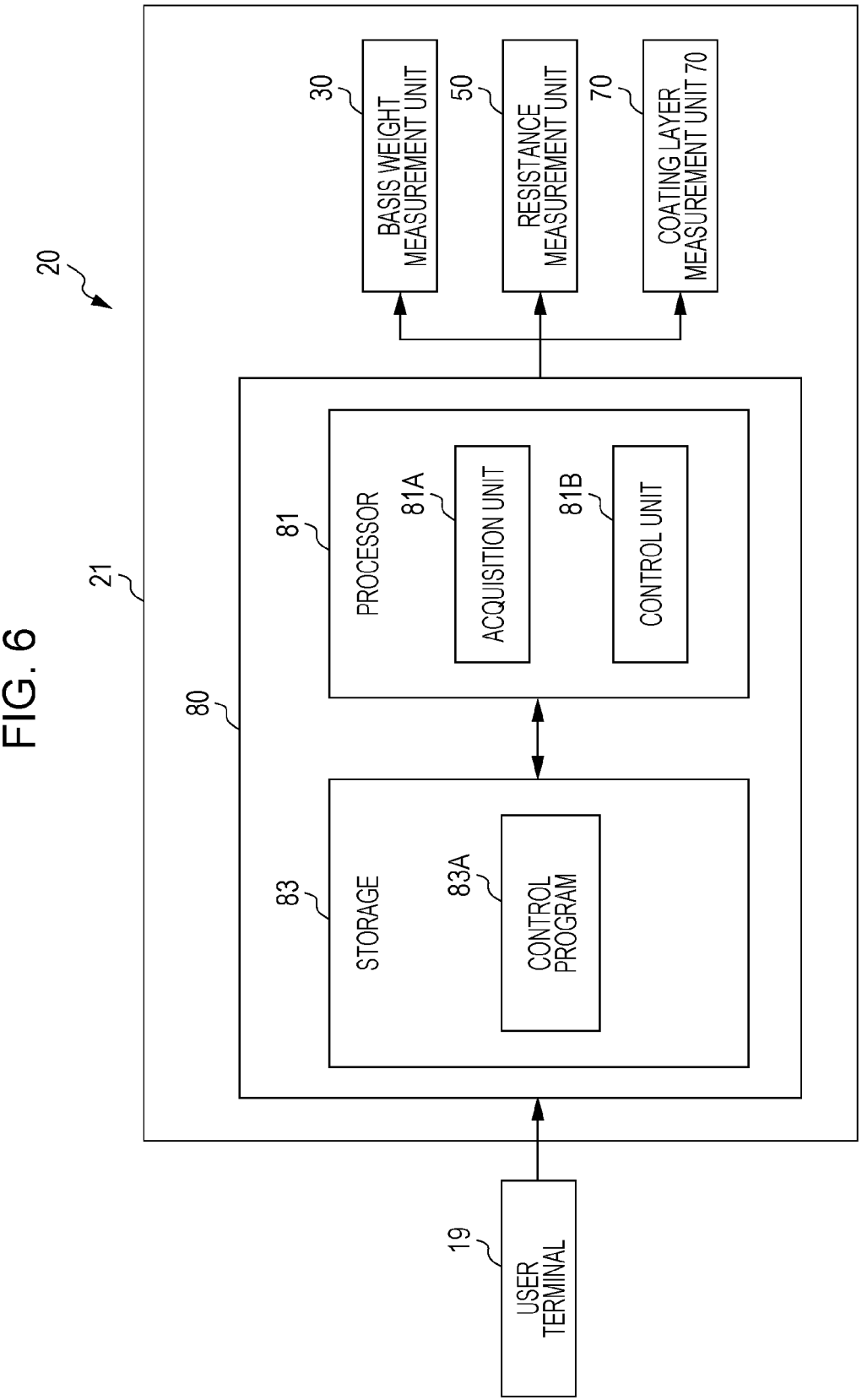
FIG. 6 is a block diagram illustrating an example of a functional configuration of a processor of the control circuit according to the exemplary embodiment.

In the control circuit 80, the processor 81 achieves various functions by executing the control program 83A. Hereinafter, a functional configuration achieved through the cooperation between the processor 81 acting as a hardware resource and the control program 83A acting as a software resource will be described. FIG. 6 is a block diagram illustrating a functional configuration of the processor 81.

As illustrated in FIG. 6, in the control circuit 80, the processor 81 executes the control program 83A to thereby function as an acquisition unit 81A and a control unit 81B.

The acquisition unit 81A acquires either an execution instruction for executing the parallel operation mode (see FIG. 3) or an execution instruction for executing the serial operation mode (see FIG. 4) as a measurement instruction from the user terminal 19. Note that in the exemplary embodiment, it is assumed that only execution instructions for the parallel operation mode and the serial operation mode are available as the measurement instruction. The parallel operation mode is an example of a "first mode", and the serial operation mode is an example of a "second mode".

The control unit 81B is capable of executing the parallel operation mode and the serial operation mode as control modes. Specifically, the control unit 81B executes the parallel operation mode in the case where the acquisition unit 81A acquires the execution instruction for executing the parallel operation mode. The control unit 81B executes the serial operation mode in the case where the acquisition unit 81A acquires the execution instruction for executing the serial operation mode. In other words, in the case where the acquisition unit 81A does not acquire the execution instruction for executing the parallel operation mode, the control unit 81B executes the serial operation mode, and does not execute the parallel operation mode.

In the parallel operation mode (see FIG. 3), the control unit 81B performs first control on the basis weight measurement unit 30 and also performs second control on the coating layer measurement unit 70. The first control is a control causing the measurement operation of measuring the basis weight to be executed in parallel with the measurement operation by the resistance measurement unit 50.

"Executed in parallel" in the first control means that at least a portion of the measurement operation by the resistance measurement unit 50 and at least a portion of the measurement operation by the basis weight measurement unit 30 are executed overlapping in time.

Also, in the first control, the control unit 81B controls the basis weight measurement unit 30 to start driving the detector 325 in the basis weight measurement unit 30 after the start of the driving of the detector 725 and before the end of actual measurement in the coating layer measurement unit 70. Specifically, in the first control, the control unit 81B controls the basis weight measurement unit 30 to start driving the detector 325 in the basis weight measurement unit 30 after the start of the driving of the detector 725 and before the start of actual measurement in the coating layer measurement unit 70.

Furthermore, in the first control, the control unit 81B controls the basis weight measurement unit 30 to execute actual measurement in the stopped period between the measurement modes in the resistance measurement unit 50. Specifically, for example, the control unit 81B controls the basis weight measurement unit 30 to execute actual measurement in the stopped period between the first measurement mode and the second measurement mode in the resistance measurement unit 50.

The second control is a control causing the measurement operation of measuring the presence or absence of a coating layer to be executed in parallel with the measurement operation by the resistance measurement unit 50, and also causing the driving of the detector 725 in the coating layer measurement unit 70 to be started before the start of the driving of the detector 325 in the basis weight measurement unit 30.

"Executed in parallel" in the second control means that at least a portion of the measurement operation by the resistance measurement unit 50 and at least a portion of the measurement operation by the coating layer measurement unit 70 are executed overlapping in time.

In the second control, the control unit 81B controls the coating layer measurement unit 70 to execute actual measurement in the stopped period between the measurement modes in the resistance measurement unit 50. Specifically, for example, the control unit 81B controls the coating layer measurement unit 70 to execute actual measurement in the stopped period between the second measurement mode and the third measurement mode in the resistance measurement unit 50. Note that the coating layer measurement unit 70 is an example of a "measurement unit disposed at a position near the resistance measurement unit".

On the other hand, in the serial operation mode (see FIG. 4), the control unit 81B causes the measurement operations by the resistance measurement unit 50, the basis weight measurement unit 30, and the coating layer measurement unit 70 to be executed serially in the order in which the detector 525 of the resistance measurement unit 50, the detector 325 of the basis weight measurement unit 30, and the detector 725 of the coating layer measurement unit 70 are arranged in the movement direction of the paper P. In other words, in the serial operation mode, the control unit 81B controls the basis weight measurement unit 30, the coating layer measurement unit 70, and the resistance measurement unit 50 to execute measurement operations in the order of the basis weight measurement unit 30, the coating layer measurement unit 70, and the resistance measurement unit 50. Note that "executed serially" means that each measurement operation is executed from start to end without overlapping in time with another measurement operation.

In the exemplary embodiment, the control circuit 80 is an example of a "control unit". Note that the processor 81 or the control unit 81B may also be understood as an example of a "control unit".

(Action According to Exemplary Embodiment)

Figure 7:
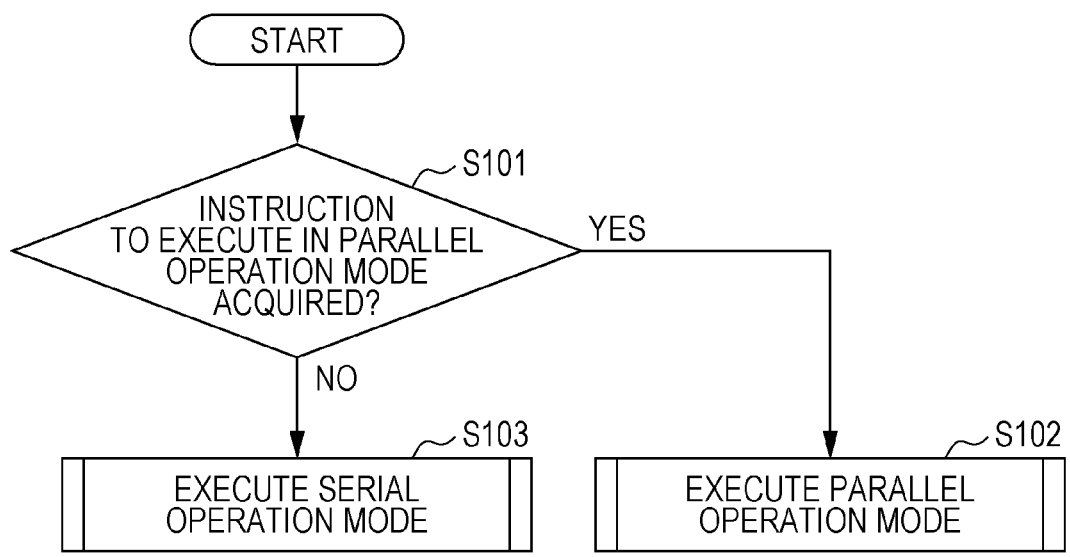
FIG. 7 is a flowchart illustrating a flow of a control process according to the exemplary embodiment.
Figure 8:
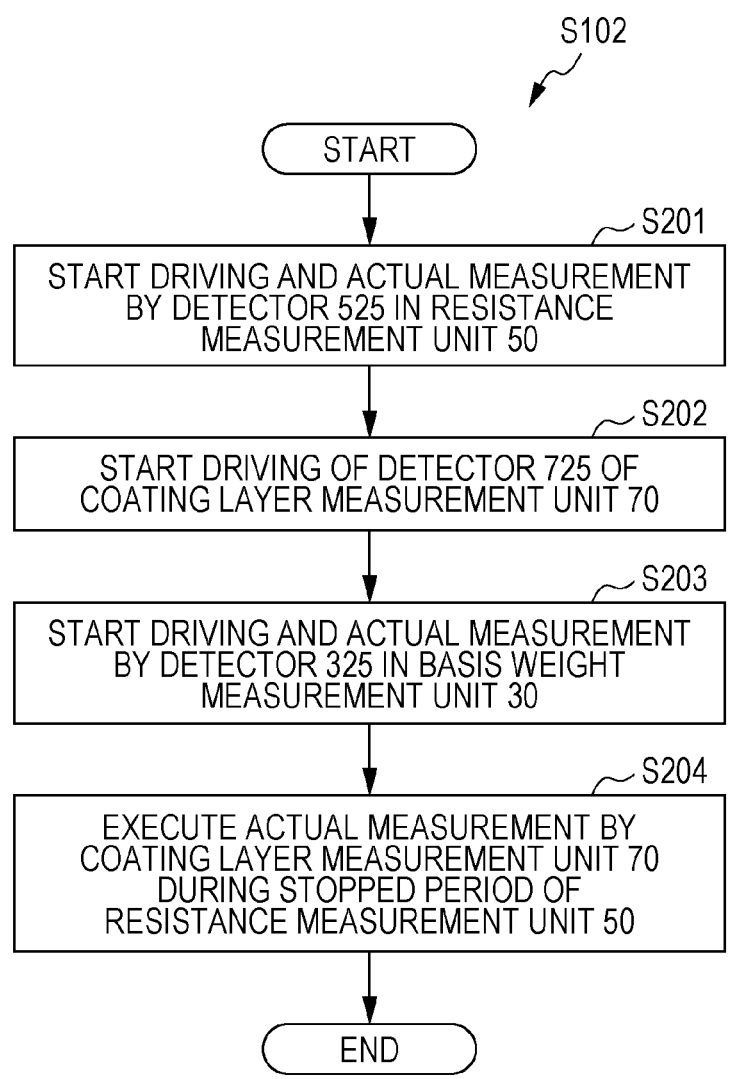
FIG. 8 is a flowchart illustrating a flow of the parallel operation mode according to the exemplary embodiment.

Next, an example of the action of the exemplary embodiment will be described. FIGS. 7, 8, and 9 are flowcharts illustrating the flow of a control process executed by the control circuit 80.

The process is performed by having the processor 81 read out and execute the control program 83A from the storage 83. For example, the execution of the process is started when the processor 81 acquires a measurement instruction from the user terminal 19.

As illustrated in FIG. 7, first, the processor 81 determines whether or not an execution instruction for executing the parallel operation mode has been acquired as a measurement instruction from the user terminal 19 (step S101). In the case of determining that an execution instruction for executing the parallel operation mode has been acquired as the measurement instruction (step S101: YES), the processor 81 executes the parallel operation mode (step S102).

On the other hand, in the case of determining that an execution instruction for executing the parallel operation mode has not been acquired as the measurement instruction (step S101: NO), the processor 81 executes the serial operation mode (step S103).

Note that because only the execution instructions for the parallel operation mode and the serial operation mode are available as the measurement instruction, "the case where an execution instruction for executing the parallel operation mode is not acquired as the measurement instruction" is equivalent to "the case where an execution instruction for executing the serial operation mode is acquired as the measurement instruction".

In the parallel operation mode (step S102), as illustrated in FIGS. 3 and 8, the processor 81 causes the resistance measurement unit 50 to start driving the detector 525 and also start actual measurement (step S201). With this arrangement, the resistance measurement unit 50 executes a measurement operation including the first, second, and third measurement modes.

Furthermore, the processor 81 causes the coating layer measurement unit 70 to start driving the detector 725 (step S202). In other words, the processor 81 causes the driving of the detector 725 in the coating layer measurement unit 70 to be started before the start of the driving of the detector 325 in the basis weight measurement unit 30. With this arrangement, the coating layer measurement unit 70 executes a driving operation on the detector 725. In other words, the processor 81 causes the measurement operation by the coating layer measurement unit 70 to be executed in parallel with the measurement operation by the resistance measurement unit 50.

In the example illustrated in FIG. 3, the start of the driving of the detector 525 and the start of actual measurement in the resistance measurement unit 50 are executed contemporaneously with the start of the driving of the detector 725 in the coating layer measurement unit 70. Note that the start of the driving of the detector 725 in the coating layer measurement unit 70 may be executed before or after the start of the driving of the detector 525 and the start of actual measurement in the resistance measurement unit 50.

Next, while the measurement operation by the resistance measurement unit 50 is being executed and the measurement operation by the coating layer measurement unit 70 (specifically, the driving of the detector 725) is being executed, the processor 81 causes the basis weight measurement unit 30 to start driving the detector 325 and also start actual measurement (step S203).

In other words, the processor 81 causes the driving of the detector 325 in the basis weight measurement unit 30 to be started after the start of the driving of the detector 725 and before the end of actual measurement in the coating layer measurement unit 70. Specifically, the processor 81 causes the driving of the detector 325 in the basis weight measurement unit 30 to be started after the start of the driving of the detector 725 and before the start of actual measurement in the coating layer measurement unit 70.

Specifically, in step S203, the processor 81 causes the basis weight measurement unit 30 to execute actual measurement in the stopped period between the first measurement mode and the second measurement mode in the resistance measurement unit 50. In other words, the processor 81 causes the measurement operation by the basis weight measurement unit 30 to be executed in parallel with the measurement operations by the resistance measurement unit 50 and the coating layer measurement unit 70.

Next, the processor 81 causes the coating layer measurement unit 70 to execute actual measurement in the stopped period between the second measurement mode and the third measurement mode in the resistance measurement unit 50 (step S204). In the parallel operation mode, the process ends when the execution of the measurement operation by the resistance measurement unit 50 ends.

Figure 4:
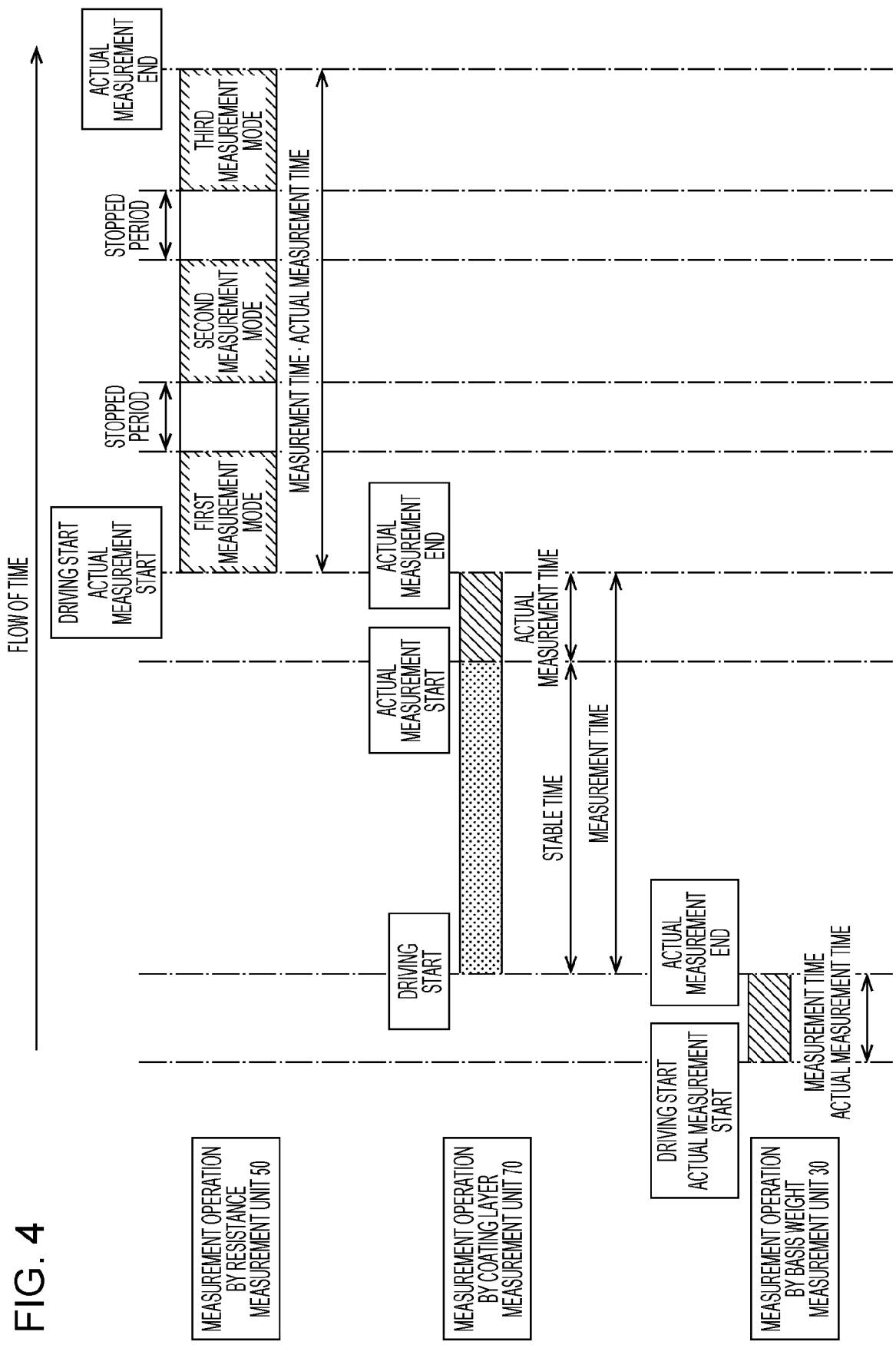
FIG. 4 is a diagram illustrating a measurement operation by each measurement unit in a serial operation mode according to the exemplary embodiment.

On the other hand, in the serial operation mode (step S103), as illustrated in FIGS. 4 and 9, the processor 81 first causes the basis weight measurement unit 30 to execute the measurement operation (step S301). Next, after the measurement operation by the basis weight measurement unit 30 ends, the processor 81 causes the coating layer measurement unit 70 to execute the measurement operation (step S302). Next, after the measurement operation by the coating layer measurement unit 70 ends, the processor 81 causes the resistance measurement unit 50 to execute the measurement operation (step S303), and ends the process.

In this way, in the serial operation mode, the processor 81 causes the basis weight measurement unit 30, the coating layer measurement unit 70, and the resistance measurement unit 50 to execute measurement operations serially in the order in which the detectors 325, 725, and 525 of the measurement units are arranged in the movement direction of the paper P.

As above, in the exemplary embodiment, in the configuration that causes the measurement operations by the basis weight measurement unit 30 and the coating layer measurement unit 70 to be executed in parallel with the measurement operation by the resistance measurement unit 50, the processor 81 causes the driving of the detector 725 in the coating layer measurement unit 70 to be started before the start of the driving of the detector 325 in the basis weight measurement unit 30 (step S201).

In this way, the coating layer measurement unit 70 having a longer stabilization time than the stabilization times in the basis weight measurement unit 30 and the resistance measurement unit 50 is driven in advance, thereby making it possible to obtain a measurement result in the coating layer measurement unit 70 earlier. As a result, in the configuration that causes the measurement operation by the basis weight measurement unit 30 and the coating layer measurement unit 70 to be executed in parallel with the measurement operation by the resistance measurement unit 50, the measurement time until the completion of the measurements of the sheet resistance value, the basis weight, and the presence or absence of a coating layer of the paper P is shortened compared to a configuration that causes the driving of the detector 725 in the coating layer measurement unit 70 to be started after the start of the driving of the detector 325 in the basis weight measurement unit 30.

Also, in the exemplary embodiment, the processor 81 causes the basis weight measurement unit 30 and the coating layer measurement unit 70 to execute actual measurement in the stopped periods between the multiple measurement modes in the resistance measurement unit 50 (steps S203 and S204).

Consequently, compared to a configuration that causes the basis weight measurement unit 30 and the coating layer measurement unit 70 to execute actual measurement during the execution of the measurement modes by the resistance measurement unit 50 (hereinafter referred to as Configuration A), the influence of noise produced by the basis weight measurement unit 30 and the coating layer measurement unit 70 are reduced in the actual measurement by the resistance measurement unit 50. Specifically, according to the exemplary embodiment, the influence of noise between the driving circuit 71 and the electric circuit 51 as well as the influence of noise between the driving circuit 31 and the electric circuit 51 are moderated compared to Configuration A.

In this way, in the exemplary embodiment, the processor 81 causes the coating layer measurement unit 70 positioned closer to the resistance measurement unit 50 compared to the basis weight measurement unit 30 to execute actual measurement in the stopped period between the multiple measurement modes in the resistance measurement unit 50 (step S204).

Consequently, compared to a configuration that causes only the basis weight measurement unit 30 positioned farther away from the resistance measurement unit 50 compared to the coating layer measurement unit 70 to execute actual measurement in the stopped period between the multiple measurement modes in the resistance measurement unit 50, the influence of noise produced by the resistance measurement unit 50 is reduced in the measurement unit that is more susceptible to such influence due to being disposed at a position near the resistance measurement unit 50.

Additionally, in the exemplary embodiment, the processor 81 causes the driving of the detector 325 in the basis weight measurement unit 30 to be started after the start of the driving of the detector 725 and before the end of actual measurement in the coating layer measurement unit 70 (step S203).

Consequently, it is possible to obtain a measurement result in the basis weight measurement unit 30 earlier compared to a configuration that causes the driving of the detector 325 in the basis weight measurement unit 30 to be started after the end of actual measurement in the coating layer measurement unit 70 (hereinafter referred to as Configuration B). For this reason, according to the exemplary embodiment, the measurement time until the completion of the measurements of the sheet resistance value, the basis weight, and the presence or absence of a coating layer of the paper P is shortened compared to Configuration B.

Specifically, in the exemplary embodiment, the processor 81 causes the driving of the detector 325 in the basis weight measurement unit 30 to be started after the start of the driving of the detector 725 and before the start of actual measurement in the coating layer measurement unit 70.

Consequently, it is possible to obtain a measurement result in the basis weight measurement unit 30 earlier compared to a configuration that causes the driving of the detector 325 in the basis weight measurement unit 30 to be started after the start of actual measurement in the coating layer measurement unit 70 (hereinafter referred to as Configuration C). For this reason, according to the exemplary embodiment, the measurement time until the completion of the measurements of the sheet resistance value, the basis weight, and the presence or absence of a coating layer of the paper P is shortened compared to Configuration C.

Also, in the serial operation mode of the exemplary embodiment, the processor 81 causes the basis weight measurement unit 30, the coating layer measurement unit 70, and the resistance measurement unit 50 to execute measurement operations serially in the order in which the detectors 325, 725, and 525 of the measurement units are arranged in the movement direction of the paper P. This configuration makes it possible to take measurements with respect to the paper P while moving the paper P. In other words, it is possible to start the measurements before the paper P is disposed between the right end of the first housing 21 and the right end of the second housing 22.

Here, with a configuration that causes the basis weight measurement unit 30, the coating layer measurement unit 70, and the resistance measurement unit 50 to execute measurement operations serially in an order different from the order in which the detectors 325, 725, and 525 of the measurement units are arranged in the movement direction of the paper P (hereinafter referred to as Configuration D), such as in the case of performing the measurement by the resistance measurement unit 50 first, for example, the processor 81 is unable to start measurement until the paper P is disposed between the right end of the first housing 21 and the right end of the second housing 22. Consequently, according to the exemplary embodiment, the measurement time until the completion of the measurements of the sheet resistance value, the basis weight, and the presence or absence of a coating layer of the paper P is shortened compared to Configuration D.

Also, in the exemplary embodiment, the control device 16 acquires the image formation instruction from the user terminal 19 and causes the image forming unit 14 and the conveyance mechanism 15 to execute image formation operations while also controlling the operations of the image forming unit 14 and the conveyance mechanism 15 on the basis of the measured value information. Consequently, a high-quality image is formed on the paper P compared to a configuration in which the image forming operations are executed irrespectively of the physical properties of the paper P.

(Exemplary Modification of Control Modes)

In the exemplary embodiment, the control unit 81B is capable of executing the parallel operation mode and the serial operation mode as control modes, but is not limited thereto. For example, the control unit 81B may also be configured to execute an image quality priority mode and an anti-jam priority mode as the control modes. Specifically, for example, the control unit 81B executes the image quality priority mode in the case where the acquisition unit 81A acquires an execution instruction for executing the image quality priority mode. The control unit 81B executes the anti-jam priority mode in the case where the acquisition unit 81A acquires an execution instruction for executing the anti-jam priority mode. Note that the image quality mode is an example of "one mode", and the anti-jam priority mode is an example of "another mode".

In the image quality priority mode, the control unit 81B performs a control similar to the parallel operation mode. With this arrangement, in the measurement device 20, measurement results (that is, measured values) regarding the sheet resistance value, the basis weight, and the presence or absence of a coating layer of the paper P are obtained. Thereafter, the control device 16 controls the operations of the image forming unit 14 and the conveyance mechanism 15 on the basis of the measured value information. Specifically, the control device 16 controls settings such as the conveyance speed of the paper P in the conveyance mechanism 15 and also the transfer voltage and fusing temperature in the image forming unit 14 on the basis of the measured value information. With this arrangement, a high-quality image is formed on the paper P.

On the other hand, in the anti-jam priority mode, the control unit 81B controls the basis weight measurement unit 30 to execute the measurement operation of measuring the basis weight of the paper P. Note that controls for executing the measurement operations of measuring the sheet resistance value and the presence or absence of a coating layer of the paper P are not performed. In other words, in the anti-jam priority mode, the measurement device 20 obtains only a measurement result (that is, a measured value) regarding the basis weight of the paper P. Thereafter, the control device 16 controls the operation (for example, the conveyance speed) of the conveyance mechanism 15 on the basis of the measured value information, for example. With this arrangement, jamming (that is, stuck paper) in the conveyance path of the paper P is reduced.

In this exemplary modification, by executing the anti-jam priority mode in cases where the user wants to prioritize minimizing jamming (that is, in cases where the user wants to measure the basis weight only), for example, it is possible to shorten the measurement time compared to a configuration in which the control unit 81B is only configured to execute the image quality priority mode.

Exemplary Modifications

In the exemplary embodiment, a recording medium is used as an example of the measurement target, but the measurement target is not limited thereto. As an example of the measurement target, a target used for a purpose other than forming an image may also be used. Also, in the exemplary embodiment, the paper P is used as an example of a recording medium, but the recording medium is not limited thereto. As an example of the recording medium, a sheet-like recording medium other than the paper P, such as a metal or plastic film, may also be used.

In the exemplary embodiment, the resistance measurement unit 50 that measures the sheet resistance value of the paper P is used as an example of a resistance measurement unit, but the resistance measurement unit is not limited thereto. As an example of the resistance measurement unit, a measurement unit that measures the volume resistance or some other physical property of a measurement target may also be used. In other words, as an example of electrical resistance, the volume resistance or some other physical property of a measurement target may also be used, for example. Note that in the case of measuring the volume resistance of the paper P, one of the pair of terminals 52 is disposed on the top side of the paper P while the other is disposed on the bottom side of the paper P, such that the pair of terminals 52 pinch the paper P in the vertical direction.

Also, in the exemplary embodiment, the basis weight measurement unit 30 that measures the basis weight [$g/m^2$] of the paper P is used as an example of a first measurement unit, but the first measurement unit is not limited thereto. As an example of the first measurement unit, a measurement unit that measures the thickness [m], the density [$g/m^3$], the mass [g], the strength (that is, rigidity), or some other physical property of a measurement target may also be used. In other words, as an example of a first physical property, the thickness [m], the density [$g/m^3$], the mass [g], the strength (that is, rigidity), or some other physical property of a measurement target may also be used, for example.

Also, in the exemplary embodiment, the coating layer measurement unit 70 that measures the presence or absence of a coating layer of the paper P is used as an example of a second measurement unit, but the second measurement unit is not limited thereto. As an example of the second measurement unit, a measurement unit that measures the moisture content or some other physical property of a measurement target may also be used. In other words, as an example of a second physical property, the moisture content or some other physical property of a measurement target may also be used, for example. Note that a measurement unit that measures a physical property by irradiating a measurement target with light (that is, a measurement unit that includes a light irradiation unit and a light reception unit) is used as the second measurement unit, for example.

In the exemplary embodiment, the control unit 81B is configured to selectively execute either the parallel operation mode or the serial operation mode, but is not limited thereto. For example, the control unit 81B may also be configured to execute only the parallel operation mode.

Also, in the "exemplary modification of control modes" described above, the control unit 81B is configured to selectively execute either the image quality priority mode or the anti-jam priority mode, but is not limited thereto. For example, the control unit 81B may also be configured to execute only the image quality priority mode.

In the exemplary embodiment, the measurement time of the resistance measurement unit 50 is longer than the measurement time of the basis weight measurement unit 30 and the measurement time of the coating layer measurement unit 70, and the measurement time of the coating layer measurement unit 70 is longer than the measurement time of the basis weight measurement unit 30, but the measurement times are not limited to the above. For example, the measurement time of the coating layer measurement unit 70 may also be longer than the measurement time of the resistance measurement unit 50, and the relationship among the lengths of the measurement time of the resistance measurement unit 50, the measurement time of the basis weight measurement unit 30, and the measurement time of the coating layer measurement unit 70 may be set in any way.

Also, in the exemplary embodiment, the processor 81 causes the basis weight measurement unit 30 to execute actual measurement in the stopped period between the first measurement mode and the second measurement mode in the resistance measurement unit 50, but is not limited thereto. For example, the processor 81 may also cause the basis weight measurement unit 30 to execute actual measurement in the stopped period between the second measurement mode and the third measurement mode in the resistance measurement unit 50.

Also, in the exemplary embodiment, the processor 81 causes the coating layer measurement unit 70 to execute actual measurement in the stopped period between the second measurement mode and the third measurement mode in the resistance measurement unit 50, but is not limited thereto. For example, the processor 81 may also cause the coating layer measurement unit 70 to execute actual measurement in the stopped period between the first measurement mode and the second measurement mode in the resistance measurement unit 50. Furthermore, the processor 81 may also cause the basis weight measurement unit 30 and the coating layer measurement unit 70 to execute actual measurement during the execution of the first, second, and third measurement modes by the resistance measurement unit 50, for example. Also, the processor 81 may cause only the coating layer measurement unit 70 positioned closer to the resistance measurement unit 50 compared to the basis weight measurement unit 30 to execute actual measurement in the stopped period between the multiple measurement modes in the resistance measurement unit 50. Alternatively, the processor 81 may cause only the basis weight measurement unit 30 positioned farther away from the resistance measurement unit 50 compared to the basis weight measurement unit 30 to execute actual measurement in the stopped period between the multiple measurement modes in the resistance measurement unit 50.

Additionally, in the exemplary embodiment, the resistance measurement unit 50 is configured to execute multiple measurement modes, but is not limited thereto. The resistance measurement unit 50 may also be configured to execute a single measurement mode.

Additionally, in the exemplary embodiment, the processor 81 causes the driving of the detector 325 in the basis weight measurement unit 30 to be started after the start of the driving of the detector 725 and before the start of actual measurement in the coating layer measurement unit 70, but is not limited thereto. For example, the processor 81 may also cause the driving of the detector 325 in the basis weight measurement unit 30 to be started after the start and before the end of actual measurement in the coating layer measurement unit 70. As another example, the processor 81 may also cause the driving of the detector 325 in the basis weight measurement unit 30 to be started after the end of actual measurement in the coating layer measurement unit 70.

Also, in the serial operation mode of the exemplary embodiment, the processor 81 causes the basis weight measurement unit 30, the coating layer measurement unit 70, and the resistance measurement unit 50 to execute measurement operations serially in the order in which the detectors 325, 725, and 525 of the measurement units are arranged in the movement direction of the paper P, but is not limited thereto. For example, the processor 81 may also be configured to cause the basis weight measurement unit 30, the coating layer measurement unit 70, and the resistance measurement unit 50 to execute measurement operations serially in a different order from the order in which the detectors 325, 725, and 525 of the measurement units are arranged in the movement direction of the paper P.

The present disclosure is not limited to the exemplary embodiment above, and various modifications, alterations, and improvements are possible without deviating from the gist of the present disclosure. For example, the configurations included in the exemplary modifications described above may also be plurally combined where appropriate.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A measurement device comprising:
a resistance measurement unit that measures an electrical resistance of a measurement target;
a first measurement unit, including a first detector that detects information indicating a first physical property other than the electrical resistance of the measurement target, that measures the first physical property from a first detection result from the first detector;
a second measurement unit, including a second detector that detects information indicating a second physical property other than the electrical resistance and the first physical property of the measurement target, that measures the second physical property from a second detection result from the second detector, in which a length of time from a start of driving the second detector until a start of actual measurement in the second measurement unit is longer than a length of time from a start of driving the first detector until a start of actual measurement in the first measurement unit; and
a control unit that performs first control causing the first measurement unit to execute a measurement operation of measuring the first physical property in parallel with a measurement operation by the resistance measurement unit, and performs second control causing the second measurement unit to execute a measurement operation of measuring the second physical property in parallel with the measurement operation by the resistance measurement unit and also causing the second measurement unit to start the driving of the second detector in the second measurement unit before the start of the driving of the first detector in the first measurement unit.

2. The measurement device according to claim 1, wherein:
the resistance measurement unit includes a plurality of measurement modes used in actual measurement of the electrical resistance of the measurement target, and
the control unit controls at least one of the first measurement unit and the second measurement unit to execute actual measurement in a stopped period during which the resistance measurement unit stops actual measurement of the electrical resistance between the plurality of measurement modes.

3. The measurement device according to claim 2, wherein:
the control unit controls the measurement unit disposed at a position nearer the resistance measurement unit from among the first measurement unit and the second measurement unit to execute actual measurement in the stopped period.

4. The measurement device according to claim 3, wherein:
the control unit controls the first measurement unit to start driving the first detector in the first measurement unit after the start of the driving of the second detector and before the end of actual measurement in the second measurement unit.

5. The measurement device according to claim 4, wherein:
the control unit controls the first measurement unit to start driving the first detector in the first measurement unit after the start of the driving of the second detector and before the start of actual measurement in the second measurement unit.

6. The measurement device according to claim 5, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

7. The measurement device according to claim 4, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

8. The measurement device according to claim 3, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

9. The measurement device according to claim 2, wherein:
the control unit controls the first measurement unit to start driving the first detector in the first measurement unit after the start of the driving of the second detector and before the end of actual measurement in the second measurement unit.

10. The measurement device according to claim 9, wherein:
the control unit controls the first measurement unit to start driving the first detector in the first measurement unit after the start of the driving of the second detector and before the start of actual measurement in the second measurement unit.

11. The measurement device according to claim 10, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

12. The measurement device according to claim 9, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

13. The measurement device according to claim 2, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

14. The measurement device according to claim 1, wherein:
the control unit controls the first measurement unit to start driving the first detector in the first measurement unit after the start of the driving of the second detector and before the end of actual measurement in the second measurement unit.

15. The measurement device according to claim 14, wherein:
the control unit controls the first measurement unit to start driving the first detector in the first measurement unit after the start of the driving of the second detector and before the start of actual measurement in the second measurement unit.

16. The measurement device according to claim 15, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

17. The measurement device according to claim 14, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit, and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

18. The measurement device according to claim 1, wherein:
the resistance measurement unit includes a third detector that detects information indicating the electrical resistance of the measurement target,
the third detector of the resistance measurement unit, the first detector of the first measurement unit, and the second detector of the second measurement unit are disposed in the above order in a movement direction of a moving measurement target, and
the control unit includes:
a first mode that performs the first control on the first measurement unit and also performs the second control on the second measurement unit; and
a second mode that causes the measurement operations of the resistance measurement unit, the first measurement unit, and the second measurement unit to be executed serially in the order in which the third detector of the resistance measurement unit, the first detector of the first measurement unit, and the second detector of the second measurement unit are disposed in the movement direction.

19. The measurement device according to claim 1, wherein:
- the first measurement unit emits an ultrasonic wave at the measurement target to measure a basis weight as the first physical property of the measurement target, and
- the control unit includes:
  - one mode that performs the first control on the first measurement unit and also performs the second control on the second measurement unit, and
  - another mode that controls the first measurement unit to execute the measurement operation of measuring the basis weight.

20. An image forming apparatus comprising:
- the measurement device according to claim 1;
- an image forming unit that forms an image on a recording medium treated as the measurement target for which the electrical resistance, the first physical property, and the second physical property are measured by the measurement device; and
- a control device that controls an image forming operation by the image forming unit on a basis of the electrical resistance, the first physical property, and the second physical property measured by the measurement device.

* * * * *